United States Patent [19]

Columbus et al.

[11] 4,345,044

[45] Aug. 17, 1982

[54] ACRYLIC WOOD FILLER

[75] Inventors: Peter S. Columbus, Whitestone; John Anderson, Brooklyn, both of N.Y.

[73] Assignee: Borden, Inc., N.J.

[21] Appl. No.: 209,502

[22] Filed: Nov. 24, 1980

Related U.S. Application Data

[63] Continuation-in-part of Ser. No. 819,466, Jul. 27, 1977, abandoned.

[51] Int. Cl.³ .............................. C08K 3/34; C08K 3/26
[52] U.S. Cl. .................................... 523/220; 524/423; 524/425; 524/446; 524/451
[58] Field of Search .................... 260/29.6 PS, 29.6 S, 260/29.6 M; 523/220; 524/423, 425, 451, 446

[56] References Cited

U.S. PATENT DOCUMENTS

| | | | |
|---|---|---|---|
| 3,256,229 | 6/1966 | Janota et al. | 260/29.6 |
| 3,749,692 | 7/1973 | Scocos | 260/29.6 PS |
| 3,854,267 | 12/1974 | Weiant et al. | 260/29.6 S |
| 3,915,917 | 10/1975 | Weiant et al. | 260/29.6 PS |

OTHER PUBLICATIONS

UCAR Vehicle 4150, Union Carbide Corporation, Jan. 1974, F-44026A, pp. 1-4.

*Primary Examiner*—James H. Derrington
*Attorney, Agent, or Firm*—Millard & Cox

[57] ABSTRACT

A barytes-containing wood filler is prepared from essential ingredients including, on weight percent basis, 6–14% acrylic resin, 3–10% platy talc, 3–10% barytes filler, 3–12% clay filler, 40–65% calcium carbonate filler and 13–35% water. A barytes-free wood filler is prepared from the same proportions of acrylic resin, calcium carbonate filler and water, together with 5–18% platy talc and 0–15% clay filler. Desirably the average particle size of the talc is about 9 microns and the average particle size of the clay is about 5 microns.

18 Claims, No Drawings

ACRYLIC WOOD FILLER

This application is a continuation-in-part of Ser. No. 819,466, filed July 27, 1977 now abandoned.

This invention relates to acrylic latex wood fillers which provide exceptional performance on both soft and hard species of wood. The fillers spread easily when applied, resist shrinking on drying and have a natural wood color. A dry film of the wood fillers stains superbly, is highly water resistant and is easy to sand. It takes nails, screws and can be cut, whittled, drilled and planed as well as shellacked, varnished and painted. It has excellent adhesion to wood, metal, paint and wallboard and is non-toxic and non-flammable, as defined by the Federal Hazardous Substances Act, with no harmful vapors and, unlike solvent type wood fillers, it is easy to remove with water from hands and tools before it dries.

The best known wood filler on the market today is Plastic Wood (Registered Trademark) which is based on wood flour and nitrocellulose and has many disadvantages when compared to the wood filler described and claimed herein. Plastic Wood is flammable, evolves toxic vapors, is very hard to spread, does not stain properly and is more difficult to sand and clean.

The wood fillers of the invention are of two principal types, namely barytes-containing and barytes-free. The broad and preferred ranges of essential ingredients of the barytes-containing wood fillers of the invention are as follows:

|  | Preferred | Broad |
|---|---|---|
| acrylic binding resin | 8-11 | 6-14 |
| platy talc | 4-6 | 3-10 |
| barytes filler | 4-6 | 3-10 |
| clay filler | 5-9 | 3-12 |
| calcium carbonate filler | 50-56 | 40-65 |
| water | 17-28 | 13-35 |

The broad and preferred ranges of essential ingredients of the barytes-free wood fillers of the invention are as follows:

|  | Preferred | Broad |
|---|---|---|
| acrylic binding resin | 8-11 | 6-14 |
| platy talc | 9-13 | 5-18 |
| clay filler | 3-8 | 0-15 |
| calcium carbonate filler | 51-57 | 40-65 |
| water | 17-28 | 13-35 |

The acrylic resin is derived from an acrylic emulsion comprising polymerized acrylate esters. The acrylic polymers can be prepared from resiliency imparting or soft monomers and hard monomers. Preferably, the soft monomers are represented by the following structural formula:

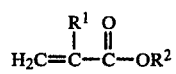

where $R^1$ is H or an alkyl group of 1 to 4 carbon atoms and $R^2$ is a straight chain or branched chain alkyl radical containing from 1 to about 14 carbon atoms. Examples of $R^2$ include methyl, ethyl, propyl, n-butyl, 2-ethylhexyl, hexyl, heptyl, octyl, 2-methylbutyl, 1-methylbutyl, 2-methylpentyl, n-hexylisobutyl, decyl, dodecyl, etc. To further define the preferred soft monomer, when $R^1$ is H or a methyl alkyl radical, $R^2$ should contain 2 to 14 carbon atoms; and when $R^1$ is alkyl of 2 to 4 carbon atoms, alkyl radical $R^2$ should contain from 6 to 14 carbon atoms.

A soft monomer(s) can be combined with a hard monomer(s) in certain proportions to yield an emulsion with desired properties for use in formulating the wood fillers described herein. The hard monomer(s), which can be used in the preparation of the acrylic emulsion, are represented by the formula

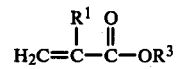

where $R^1$ is as defined in connection with the soft monomer, i.e., is H or an alkyl group of 1 to 4 carbon atoms, whereas $R^3$ is preferably alkyl selected from methyl and alkyl groups containing from about 13 to about 20 carbon atoms when $R^1$ is H; and $R^3$ is preferably alkyl containing 1 to 5 or from 15 to 20 carbon atoms when $R^1$ is methyl. Examples of hard monomers include methyl acrylate, vinyl acetate, tetradecyl acrylate, pentadecyl acrylate, methyl methacrylate, ethyl methacrylate, t-butyl acrylate, butyl methacrylate and pentadecyl methacrylate.

The designation $T_g$ stands for glass transition temperature of a polymer and is a conventional criterion of polymer hardness. For applications where exceptional flexibility is not necessary, as in this case, $T_g$ of the polymer can be between 0° and 25° C. Examples of $T_g$ for the more common homopolymers are given below:

| Homopolymer of: | $T_g$ °C. |
|---|---|
| ethyl acrylate | −23 |
| n-octyl acrylate | −80 |
| n-decyl methacrylate | −60 |
| 2-ethylhexyl acrylate | −70 |
| n-butyl acrylate | −56 |
| octyl methacrylate | −20 |
| n-tetradecyl methacrylate | −9 |
| methyl acrylate | 9 |
| N-tetradecyl acrylate | 20 |
| t-butyl acrylate | 43 |
| methyl methacrylate | 105 |
| acrylic acid | 106 |

These and other monomers can be blended to give the desired $T_g$.

The acrylic resins used in preparing our wood fillers are in the form of aqueous acrylic emulsions. Preferred acrylic emulsions for our purpose are white in color wherein the particle size range is 0.18 to 0.20 of a micron in diameter. Although other Rhoplex TM acrylic emulsions, sold by Rohm and Haas, are suitable, Rhoplex E-330 and Rhoplex AC-34 acrylic emulsions in 1:1 ratio perform eminently in the wood filler compositions. Rhoplex E-330 acrylic emulsion has a non-ionic charge, percent solids content of about 47%, pH of 9.5 to 10.0, a minimum film-forming temperature range of 10° to 12° C., $T_g$ of the polymer is 6° to 8° C. and its clear film ultimate Tukon hardness (KHN) is less than 1 or about 0.5. Rhoplex E-330 acrylic emulsion is believed to have been prepared from the following monomers given in weight percent:

| Methyl methacrylate | 70% |
|---|---|
| butyl acrylate | 30% |

Rhoplex AC-34 acrylic emulsion has a particle size range of 0.10 to 0.11 of a micron in diameter, $T_g$ of 7° to 9° C., a minimum film-forming temperature of 9° C. and the same solids and pH as Rhoplex E-330 acrylic emulsion, i.e., solids of about 47% and pH of 9.5 to 10.0. Rhoplex AC-34 acrylic emulsion is believed to have been prepared from the following monomers given in weight percent:

| ethyl acrylate | 66% |
|---|---|
| methyl methacrylate | 33% |
| acrylic acid | 1% |

The acid which is used in the preparation of the emulsions aids in cross-linking and is selected from unsaturated mono or polycarboxylic acids, examples of which include sorbic, acrylic, acryloxy-acetic, cinnamic, maleic, fumaric, crotonic, itaconic, etc. The alpha-beta unsaturated monocarboxylic acids are preferred, especially acrylic and methacrylic acids. On the basis of dry resin in the emulsions, the amount of the acid can vary from about 0.2 to 5%, preferably from 0.5 to 3%. A small amount of about 1 to 3% of a nitrogenous compound can also be used in the preparation of the acrylic emulsions. An example of such a nitrogenous compound is dimethylaminomethyl methacrylate which acts as a softening monomer and as a stabilizer. Other loweralkylamino loweralkyl acrylates and methacrylates, as well as other nitrogenous compounds, can be used as is known in the art.

An essential ingredient in the acrylic wood fillers described herein is platy talc. The particle size of the talc may vary but is still preferably about 9 microns. A specific preferred talc is Emtal #500 talc sold by Engelhard Minerals and Chemicals. This specific talc is a naturally occurring hydrous non-metallic magnesium silicate exhibiting high brightness and low abrasion and having an average particle size of 9 microns. This talc is platy in character with no trace of any fibrous talc or asbestiform minerals. Platy talc is soft with low abrasion, has good lubricity with excellent sanding and troweling, is low in soluble salts which results in good chemical and water resistance, and has excellent dispersion in organic media. The use of platy talc results in wood fillers which are non-cracking, have high solids content and good spreadability. Composition of Emtal #500 talc is the following, in weight percent:

| magnesium oxide (MgO) | 30.8% |
|---|---|
| silicon dioxide ($SiO_2$) | 56.2% |
| calcium oxide (CaO) | 0.4% |
| aluminum oxide ($Al_2O_3$) | 0.5% |

Other typical physical properties of Emtal #500 talc are the following:

| particle shape | platy |
|---|---|
| % on 200 mesh | 0.01 |
| % on 325 mesh | 0.2 |
| average particle size | 9.0 microns |
| pH | 9.3–9.8 |
| specific gravity | 2.8 |

Another grade of Emtal talc found to be suitable for our purpose includes Emtal #41 which is similar to Emtal #500 except it is slightly denser and darker than Emtal #500. Photovolt brightness of Emtal #500 is 83% as compared to 77% for Emtal #41.

Fibrous or non-platy talcs such as Fibertal #2 and Fibertal #6, were tried in the wood filler formulations but produced undesirable results. Fibertal #2, when substituted for Emtal #500, resulted in a wood filler that was excessively high in viscosity, difficult to manufacture and fill, and gave very poor spreading properties. It also shrank more than the Emtal #500 formulation and cracked slightly after drying. Fibertal #6, when substituted for Emtal #500, gave a more workable consistency but shrank and cracked more than the Fibertal #2 formulation. Both Fibertals contain asbestos fibers which make them hazardous to health. It appears that the use of platy talc is mandatory to obtain a wood filler with excellent spreading properties and good viscosity stability for easy manufacture and filling. Due to the presence of platy talcs, the wood filler is resistant to sagging, shrinking and cracking during and after drying; and when dry, has excellent sandability.

Barytes is a heavy filler being composed of about 98% barium sulfate and also contains 0.85% silica, 0.009% ferric oxide and a maximum moisture of 0.25%. Its pH is 3.8 to 4.5 and oil absorption is 11. About 95% of barytes particles are less than 20 microns in diameter and 10% thereof have a particle size less than 1 micron. The No. 1 Barytes from Pfizer have been found to perform very well in the wood filler. The function of this filler is to allow for better penetration of stain.

In the compositions of the invention, the clay filler, if present, preferably has an average particle size of about 5 microns. As the amount of clay filler in the barytes-free compositions is reduced or eliminated, the amount of talc therein should be increased in order to provide a filler of optimum consistency. A specific preferred clay filler is ASP 400 aluminum silicate clay which can be obtained from Engelhard Minerals & Chemicals. Its presence in the wood filler formulation facilitates sanding, reduces sagging, imparts proper pseudoplasticity and makes it easier to accept stain probably for the reason that it has relatively large particle size, the average being at about 5 microns. About 90% of this clay is smaller than 17 microns and only 10% is smaller than 1.6 microns. Its pH is 3.8 to 4.6 and oil absorbtion is 28 to 32.

The principal filler we use in the wood filler is calcium carbonate in powder form of small particle size which is blended into the formulation to provide a crack-resistant product which has good sandability. This filler also contributes to the proper consistency of the wood filler. The filler must have proper particle size since if it is too coarse, the spackle will be too fluid and it will settle out; and if too fine, the spackle will be difficult to spread and sand. The fillers promote proper consistency with high solids and texture of dry film which properties are related to non-shrinking, non-cracking and easy sanding features after drying. We prefer to use Chemcarb #55 calcium carbonate which has a mean particle size of 12 microns, solubility in water of 0.06%, specific gravity of 2.71, moisture of 0.10% and pH of 9.2–9.5. Its typical chemical composition is as follows:

| calcium carbonate | 96.0% |
| magnesium carbonate ($MgCO_3$) | 3.0% |
| Silica ($Si_2$) | 0.50% |
| alumina ($Al_2O_3$) | 0.34% |
| iron oxide ($Fe_2O_3$) | 0.06% |
| moisture | 0.10% |

The mean particle size of the calcium carbonate filler herein is important to produce the wood filler with desired properties and should, in the preferred embodiment, be within the range of 11 to 13 microns although fillers with mean particle size of about 5 to 15 microns are suitable. Other grades of Chemcarb filler which were found suitable, although marginally in some cases, include Chemcarb #44 which has a mean particle size of about 5 microns and Chemcarb #55 which has a size of about 14 microns.

Enough water is added to the wood filler composition to obtain a pasty consistency which translates into a viscosity which should be in the range of about 120,000 to 250,000 and preferably from 160,000 to 180,000 cps, Brookfield RVF with a #7 spindle measured at 4 rpm and 25° C. Its solids concentration should range within 75 to 95%, preferably about 82%.

Other ingredients are also added to the wood filler composition including pigments, pigment dispersants, preservatives, surfactants, defoamers, thickeners, etc.

Preparation procedure for the wood filler is quite straightforward. The ingredients are added to a blender and mixed until a smooth and a homogeneous dispersion is obtained, which may take about one hour. As an extra precaution, the thickener should be added very slowly with agitation.

Surfaces to which the wood filler is applied should be clean, dry and free of grease, oil and loose particles. The surface and the wood filler should be at a temperature of 40° F. or warmer. Application of the wood filler should be generous and excess can be removed with a putty knife but some extra wood filler should remain to allow for flush sanding after drying. For normal repairs, one application usually suffices although for deeper cracks, two or more applications are better than one heavy one. The wood filler must dry between applications. Shallow repairs can be sanded after 15 minutes of application but deep repairs require 1 to 8 hours. Avoid high speed sanding. If a machine sander is used, use on-off-on-off action. Desired finish may be applied after sanding, 1 hour being allowed for drying of water-based paint and overnight for oil-based paint, shellac or varnish. Stain should be applied within 1 hour after sanding. Staining requires medium to coarse sanding for best results. If fine-sanded, stain will need more time for penetration. For true wood match, test wood scrap to determine proper stain color and time for both filler and wood. After finishing a job, tools and hands can be washed with water before the wood filler dries.

Preparation of the wood fillers described herein will now be illustrated by showing exact amounts of ingredients used therefor.

EXAMPLE I

The following constitute ingredients for preparing a specific formulation for a wood filler described herein, in weight percent.

| (1) water | 6.79 |
| (2) bacteriocide (Merbac 35) | 0.15 |
| (3) bacteriocide and fungicide (Proxel CRL) | 0.05 |
| (4) surfactant (Triton X-405) | 0.51 |
| (5) pigment dispersant (Tamol 850) | 0.21 |
| (6) anhydrous potassium tripolyphosphate | 0.50 |
| (7) nonionic surfactant (Nopco NXZ) | 0.03 |
| (8) 47% solids acrylic emulsion (Rhoplex E-330) | 10.51 |
| (9) 47% solids acrylic emulsion (Rhoplex AC-34) | 10.00 |
| (10) platy talc having an average particle size of about 9 microns. (Emtal #500) | 5.13 |
| (11) barium sulfate filler (No. 1 Barytes) | 5.13 |
| (12) clay filler having an average particle size of about 5 microns. (ASP-400 clay) | 7.18 |
| (13) calcium carbonate filler (Chemcarb 55) | 53.38 |
| (14) thickener (Methocel E-4-M) | 0.31 |
| (15) coloring material (CB-262-A 45% yellow oxide) | 0.12 |
| | 100.00 |

Merbac 35 is sold by Merck and contains at least 90% benzyl bromoacetate. It is miscible with many organic solvents but is immiscible with water. When dispersed, it is extremely effective against a broad spectrum of microorganisms which attack raw materials resulting in putrefaction, viscosity loss, and spoilage of aqueous systems in storage and stored containers. Proxel CRL, which is watersoluble, is sold by ICI America, Inc. and contains 30% 1, 2-benzisothiazolin-3-one and is a bactericide-fungicide added for extra protection against microorganisms. Triton X-405, sold by Rohm and Haas, is octylphenoxy-polyethoxy ethanol nonionic surfactant containing 40 ethylene oxide units. Tamol 850, a sodium salt of glacial methacrylic acid sold by Rohm and Haas, is a 30% aqueous pigment dispersant which is used to disperse and stabilize pigments and extenders in aqueous systems. It is a low-foaming dispersant especially useful in systems involving dispersions in inorganic acids, such as titanium dioxide, and is efficient over a wide pH range in numerous latex systems. Its pH is 9.0 to 10.5 (of a 10% aqueous solution), freezing point of 0° to −10° C., Brookfield viscosity (25° C., #2 spindle, 60 rpm) is 125 to 325 cps. Methocel E-4-M, sold by Dow, is a hydroxypropyl methyl cellulose thickener. Potassium tripolyphosphate is a pigment dispersant and wetting agent.

In preparing the wood filler, (1) was added with agitation to a clean, dry fiberglass bin, followed by addition of (2), (3), (4), (5), (6), (7), (8), and (9). Item (6) was sprinkled in. The dispersion was mixed slowly for about five minutes and then, with continued agitation, items (10), (11), (12) and (13) were added with precautions taken to avoid lumping. The agitator bow-tie blade was raised to just below the surface of the dispersion and (14) was sprinkled-in under medium agitation of the contents. Item (15) was added and slow agitation of the dispersion was continued for about one-half hour or until it became smooth and homogeneous. A sample was removed for viscosity test; the viscosity can be adjusted with not more than about 0.75% of water. The resulting wood filler will have the following specifications:

| viscosity at 4 rpm, 25° C. | 160,000–180,000 cps |
| pH | about 9 |
| solids | about 82% |
| color | light yellow |

It should be noted that the combination of about 1:1 Rhoplex E-330 and Rhoplex AC-34 acrylic emulsions is used. A wood filler needs more flexibility than Rhoplex E-330 can provide, it being relatively inflexible since methyl methacrylate has a $T_g$ of $+105°$ C. and butyl acrylate, a $T_g$ of $+43°$ C. Rhoplex AC-34, which apparently is prepared from 66% ethyl acrylate, is relatively soft since $T_g$ of ethyl acrylate is $-23°$ C. Rhoplex AC-34 has specific adhesion to wood in addition to having higher flexibility than Rhoplex E-330, which has good properties for use on plaster and concrete but not on wood. When only Rhoplex E-330 was used, the resulting wood filler was too hard and had no flexibility, which resulted in cracking; when only Rhoplex AC-34 was used, the wood filler was too soft and could not be sanded. Amount of the binder resin should be controlled since an excess thereof will affect the staining property of the wood filler.

The fillers also have to be carefully selected. If the particle size of the fillers is too coarse, it will settle out, however, if the particle size is too small, penetration of the stain will be impeded. Fillers must be selected to achieve adequate acceptance of stain and to impart desirable sanding property and brief drying time.

To show the desirability of selecting the optimum particle sizes of talc and clay filler, comparative tests were conducted using the above composition of the invention, and a similar composition (Control Composition 1) in which Emtal #500 talc and ASP-400 clay filler were replaced by CP-14-35 talc and ASP-600 clay filler, and with a commercially-recommended filler (Control Composition No. 2) which is described in a leaflet entitled "UCAR Vehicle 4150" produced by Union Carbide and dated January, 1974. Control Compostion No. 2 consisted of the following components:

|  | Percent by Weight |
| --- | --- |
| (1) water | 15.28 |
| (2) thickener (Cellosize QP-09-L) | 0.74 |
| (3) ammonium hydroxide (28%) | 0.01 |
| (4) surfactant (Daxad 30, 25%) | 0.62 |
| (5) polypropylene glycol (NIAX-PPG-1025) | 0.31 |
| (6) surfactant (Tergitol 15-S-9) | 0.16 |
| (7) anti-microbial agent (Dowicil 75) | 0.11 |
| (8) anti-foaming agent (Colloids 581-B) | 0.20 |
| (9) acrylic resin (UCAR Vehicle 4150, 55% solids by weight) | 19.33 |
| (10) ammonium hydroxide (28%) | 0.07 |
| (11) calcium carbonate (Vicron 41-8) | 49.37 |
| (12) barytes No. 1 | 3.48 |
| (13) ASP-600 clay filler | 6.84 |
| (14) Microtalc CP-14-35 | 3.48 |
|  | 100.00 |

CP-14-35 is a platy talc having an average particle size of about 2 microns, while ASP-600 clay filler, which is made by the same manufacture as ASP-400, is closely similar to ASP-400 but has an average particle size of only 0.8 microns. UCAR Vehicle 4150 is a vinyl acetate/acrylic copolymer latex made by Union Carbide. A fourth composition (Control Composition No. 3), similar to Control Composition No. 2 but with Emtal #500 talc and ASP-400 clay filler substituted for the CP-14-35 talc and the ASP-600 clay filler, was also tested.

The filler compositions were applied to white pine and allowed to dry for 24 hours, then sanded and stained with Minwax stains #210 B (Golden Oak), 235 (Cherry) and 2716 (Dark Walnut). Staining was affected by applying the stains to the dry wood fillers with a cloth and allowing the stain to soak into the fillers for five minutes, then wiping away excess stain with a clean cloth. The fillers were rated both with respect to ease-of-sanding and ease-of-acceptance of stain.

As regards both ease-of-sanding and ease-of-acceptance of stain, significant differences existed among the three samples, the composition of the invention being superior to Control Composition No. 1, which was in turn significantly better than Control Composition No. 2. The performance of Control Composition No. 3 was intermediate that of Control Composition No. 1 and 2 in both respects.

It should also be noted that the acrylic resin comprising polymerized acrylate esters used in the compositions of the invention provides significant advantages in ease-of-acceptance of stain as compared with other types of resins used in prior art compositions. In particular, the polymerized acrylate ester acrylic resins are much more susceptible to penetration by typical aliphatic hydrocarbon stains than the vinyl acetate/acrylic copolymer latex used in Control Composition No. 2 referred to above. The following experiments demonstrate the superior ease-of-acceptance of stain of the composition of the invention.

In these staining experiments four different fillers were tested. The first two fillers were the composition of the invention and the commercially-recommended Control Composition No. 2 described above. In Control Composition No. 4, the Rhoplex E-330 and AC-34 in the composition of Example I were replaced by the UCAR 4150 used in Control Composition No. 2. Control Composition No. 5 was similar to Control Composition No. 2, but with the Rhoplex E-330 and AC-34 mixture being substituted for the UCAR 4150 in Control Composition No. 2.

The four fillers being tested were applied to white pine and stained in the same manner as described above. Significant differences in ease-of-acceptance of stain were noted, the composition of the invention accepting the stain most readily followed by Control Compositions No. 5, 4 and 2 in decreasing order of ease-of-acceptance of stain. Thus, not only did the composition of the invention outperform all the control compositions, but both of the compositions containing the Rhoplex polymerized acrylate ester acrylic resin outperformed both the compositions using the UCAR vinyl acetate/acrylic copolymer latex.

The following two examples show barytes-free compositions of the invention

EXAMPLE II

The following constitute ingredients for preparing the most-preferred barytes-free composition of the invention, in weight percent.

| (1) water | 8.09 |
| --- | --- |
| (2) bacteriocide (Merbac 35) | 0.15 |
| (3) bacteriocide and fungicide (Proxel CRL) | 0.05 |
| (4) surfactant (Triton X-405) | 0.51 |
| (5) pigment dispersant (Tamol 850) | 0.21 |
| (6) anhydrous potassium tripolyphosphate | 0.50 |
| (7) nonionic surfactant (Nopco NXZ) | 0.05 |
| (8) 47% solids acrylic emulsion (Thoplex E-330) | 10.51 |
| (9) 47% solids acrylic emulsion (Rhoplex AC-34) | 10.00 |
| (10) Platy talc having an average particle size of about 9 microns. (Emtal #500) | 12.00 |
| (11) clay filler (ASP-400 clay) | 4.50 |

-continued

| | | |
|---|---|---|
| (12) calcium carbonate filler (Chemcarb 55) | 52.00 | |
| (13) water | 1.00 | |
| (14) thickener (Methocel E-4-M) | 0.31 | |
| (15) coloring material (CB-262-A 45% yellow oxide) | 0.12 | |
| | 100.00 | |

The constituents of the wood filler were mixed in a clean, dry fiberglass bin in the same manner as in Example I above except that, of course, no barytes was added and that after the calcium carbonate had been added the second batch of water was added in order to keep the consistency of the mixture workable.

The above composition, when tested for ease-of-sanding and ease-of-acceptance of stain in the manner described above was found to accept stain more easily than the composition of Example I and to sand more easily. In addition, the composition was found to suffer less cracking during drying when used in layers more than ⅛ of an inch thick.

EXAMPLE III

The following constitutes ingredients for preparing a further barytes-free wood filler of the invention, in weight percent.

| | | |
|---|---|---|
| (1) water | 6.79 | |
| (2) bacteriocide (Merbac 35) | 0.15 | |
| (3) bacteriocide and fungicide (Proxel CRL) | 0.05 | |
| (4) surfactant (Triton X-400) | 0.51 | |
| (5) pigment dispersant (Tamol 850) | 0.21 | |
| (6) anhydrous potassium tripolyphosphate | 0.50 | |
| (7) nonionic surfactant (Nopco NXZ) | 0.05 | |
| (8) 47% solids acrylic emulsion (Rhoplex E-330) | 10.51 | |
| (9) 47% solids acrylic emulsion (Rhoplex AC-34) | 10.00 | |
| (10) platy talc Emtal #500 | 7.50 | |
| (11) clay filler (ASP-400 clay) | 5.00 | |
| (12) calcium carbonate filler (Chemcarb 55) | 58.30 | |
| (13) thickener (Methocel E-4-M) | 0.31 | |
| (14) coloring material (CB-262-A 45% yellow oxide) | 0.12 | |
| | 100.00 | |

The components of the wood filler were mixed in the same manner as Example II above. Although the ease-of-acceptance of stain and the sanding and cracking properties of this composition were not quite as good as those of the composition of Example II, they were about the same as those of the composition of Example I and thus, the above composition represents a practically-useful, barytes-free wood filler composition.

We claim:

1. Wood filler composition which provides exceptional performance on soft and hard species of wood, which is easily spreadable, resists shrinking on drying and cracking, stains superbly, is highly water resistant, can be sanded easily and which has excellent adhesion to wood, metal and paint, said composition having a viscosity of 120,000 to 250,000 cps. and comprising on solids basis 6 to 14% acrylic resin comprising polymerized acrylate esters, 3 to 10% platy talc having an average particle size of about 9 microns, 3 to 12% clay filler having an average particle size of about 5 microns, 3 to 10% barytes filler, 40 to 65% calcium carbonate filler and 13 to 35% water.

2. Composition of claim 1 wherein the acrylic resin is selected from soft monomers having the formula

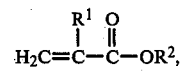

hard monomers of the formula

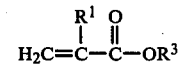

and mixtures thereof, wherein $R^1$ is H or an alkyl group of 1 to 4 carbon atoms and $R^2$ is an alkyl radical of 1 to 14 carbon atoms; and $R^3$ is H, methyl, alkyl radical of 1 to 5 carbon atoms or alkyl radical of 15 to 20 carbon atoms; the resin being also prepared with an alpha-beta unsaturated monocarboxylic acid in amount of about 0.2 to 5%, based on the weight of the resin, to aid in cross-linking.

3. Composition of claim 2 wherein the preferred resin is further defined as follows: when $R_1$ of the soft monomer is H or methyl, $R^2$ contains about 1 to 14 carbon atoms whereas when $R^1$ is alkyl of 2 to 4 carbon atoms, then $R^2$ is alkyl of 6 to 14 carbon atoms; and as to $R^3$ of the hard monomers, when $R^1$ is H, $R^3$ is alkyl of 1 or 13 to 20 carbon atoms whereas when $R^1$ is methyl, $R^3$ is alkyl of 1 to 5 carbon atoms or from 15 to 20 carbon atoms.

4. Composition of claim 3 wherein $R^1$ is H or methyl and $R^2$ and $R^3$ are selected from alkyl group of 1 to 8 carbon atoms; and the acid is selected from acrylic and methacrylic acids.

5. Composition of claim 4 wherein amounts of the ingredients are 8 to 11% of the acrylic resin, 4 to 6% of platy talc, 4 to 6% of barytes filler, 5 to 9% clay filler, 50 to 56% calcium carbonate filler and 17 to 28% of water.

6. Composition of claim 4 wherein the resin has a $T_g$ of about 0° C., is in emulsion form and is prepared from ethyl acrylate, butyl acrylate, methyl methacrylate and the acid.

7. Composition of claim 6 wherein amount of ethyl acrylate exceeds 50% of the resin, and amount of the acid is 0.5 to 3%.

8. Composition of claim 5 wherein the resin has a $T_g$ of about 0° to 25° C., is in emulsion form and is prepared from ethyl acrylate in amount exceeding 50%, methyl methacrylate in amount of 25 to 35% and the acid in amount of 0.5 to 3%.

9. Composition of claim 7 wherein the barytes filler comprises in excess of about 95% barium sulfate with more than 90% thereof having particle size less than 20 microns; the clay filler is aluminum silicate; and the calcium carbonate filler has a mean particle size of about 5 to 15 microns; and viscosity of the composition is 160,000 to 180,000 cps.

10. Wood filler composition which provides exceptional performance on soft and hard species of wood, which is easily spreadable, resists shrinking on drying and cracking, stains superbly, is highly water resistant, can be sanded easily and which has excellent adhesion to wood, metal and paint, said composition comprising on solids basis 6 to 14% acrylic resin comprising polymerized acrylate esters, 5 to 18% platy talc having an average particle size of about 9 microns, 3 to 15% clay filler having an average particle size of about 5 microns, 40 to 65% calcium carbonate filler and 13 to 35% water.

11. Composition of claim 10 wherein the acrylic resin is selected from soft monomers having the formula

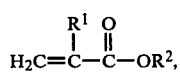

hard monomers of the formula

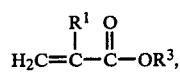

and mixtures thereof, wherein $R^1$ is H or an alkyl group of 1 to 4 carbon atoms and $R^2$ is an alkyl radical of 1 to 14 carbon atoms; and $R^3$ is H, methyl, alkyl radical of 1 to 5 carbon atoms or alkyl radical of 15 to 20 carbon atoms; the resin being also prepared with an alpha-beta unsaturated monocarboxylic acid in amount of about 0.2 to 5%, based on the weight of the resin, to aid in cross-linking.

12. Composition of claim 11 wherein the preferred resin is further defined as follows: when $R_1$ of the soft monomer is H or methyl, $R^2$ contains about 1 to 14 carbon atoms whereas $R^1$ is alkyl of 2 to 4 carbon atoms, then $R^2$ is alkyl of 6 to 14 carbon atoms; and as to $R^3$ of the hard monomers, when $R^1$ is H, $R^3$ is alkyl of 1 or 13 to 20 carbon atoms whereas when $R^1$ is methyl, $R^3$ is alkyl of 1 to 5 carbon atoms or from 15 to 20 carbon atoms.

13. Composition of claim 12 wherein $R^1$ is H or methyl and $R^2$ and $R^3$ are selected from alkyl group of 1 to 8 carbon atoms; and the acid is selected from acrylic and methacrylic acids.

14. Composition of claim 13 wherein amounts of the ingredients are 8 to 11% of the acrylic resin, 9 to 13% of platy talc, not more than 8% clay filler, 51 to 57% calcium carbonate filler and 17 to 28% of water.

15. Composition of claim 13 wherein the resin has a $T_g$ of about 0° C. to 25° C., is in emulsion form and is prepared from ethyl acrylate, butyl acrylate, methyl methacrylate and the acid.

16. Composition of claim 15 wherein amount of ethyl acrylate exceeds 50% of the resin, and amount of the acids is 0.5 to 3%.

17. Composition of claim 14 wherein the resin has a $T_g$ of about 0° to 25° C., is in emulsion form and is prepared from ethyl acrylate in amount exceeding 50%, methyl methacrylate in amount of 25 to 35% and the acid in amount of 0.5 to 3%.

18. Composition of claim 17 wherein the clay filler is aluminum silicate; the calcium carbonate filler has a mean particle size of about 5 to 15 microns; and the viscosity of the composition is 160,000 to 180,000 cps.

* * * * *